(12) United States Patent
Du et al.

(10) Patent No.: US 10,708,576 B2
(45) Date of Patent: Jul. 7, 2020

(54) LIGHT FIELD DISPLAY CONTROL METHOD AND APPARATUS, AND LIGHT FIELD DISPLAY DEVICE

(71) Applicant: Beijing Zhigu Rui Tuo Tech Co., Ltd., Beijing (CN)

(72) Inventors: Lin Du, Beijing (CN); Liang Zhou, Beijing (CN)

(73) Assignee: BEIJING ZHIGU RIU TECH CO., LTD., Beijing (CN)

( * ) Notice: Subject to any disclaimer, the term of this patent is extended or adjusted under 35 U.S.C. 154(b) by 192 days.

(21) Appl. No.: 15/382,621

(22) Filed: Dec. 17, 2016

(65) Prior Publication Data
US 2017/0195659 A1    Jul. 6, 2017

(30) Foreign Application Priority Data

Dec. 31, 2015    (CN) .......................... 2015 1 1029526

(51) Int. Cl.
| | |
|---|---|
| *H04N 13/305* | (2018.01) |
| *H04N 13/128* | (2018.01) |
| *H04N 13/383* | (2018.01) |
| *H04N 13/307* | (2018.01) |
| *H04N 13/00* | (2018.01) |

(52) U.S. Cl.
CPC ......... *H04N 13/305* (2018.05); *H04N 13/128* (2018.05); *H04N 13/307* (2018.05); *H04N 13/383* (2018.05); *H04N 2013/0081* (2013.01)

(58) Field of Classification Search
CPC .. H04N 13/128; H04N 13/383; H04N 13/307; H04N 2013/0081

USPC .......................................................... 348/59
See application file for complete search history.

(56) References Cited

U.S. PATENT DOCUMENTS

| | | | | |
|---|---|---|---|---|
| 2002/0159156 | A1* | 10/2002 | Wohlstadter | B82Y 30/00 359/626 |
| 2004/0263783 | A1* | 12/2004 | Neal | G01B 11/306 351/221 |
| 2006/0007301 | A1* | 1/2006 | Cho, II | G02B 3/14 348/51 |

(Continued)

FOREIGN PATENT DOCUMENTS

| | | |
|---|---|---|
| CN | 104486537 A | 4/2015 |
| TW | 200607362 A | 2/2006 |

*Primary Examiner* — Joseph G Ustaris
*Assistant Examiner* — Jimmy S Lee
(74) *Attorney, Agent, or Firm* — Sheppard Mullin Richter & Hampton LLP

(57) ABSTRACT

Embodiments of the present application disclose a light field display control method and apparatus and a light field display device. The light field display control method comprises: determining a partial depth distribution sub-region of content according to at least depth distribution information of the content; and adjusting a focal length of a first lenslet according to at least a display depth of field (DoF) range of a light field display device and the depth distribution sub-region, wherein the first lenslet is a lenslet that is in a lenslet array of the light field display device and affects display of a first object, and the first object is a part, which is located in the depth distribution sub-region, of the content. The present application can improve display quality of an object which is located in a partial depth distribution sub-region of content to be displayed or content being displayed.

25 Claims, 8 Drawing Sheets

(56) References Cited

U.S. PATENT DOCUMENTS

| | | | |
|---|---|---|---|
| 2011/0075257 A1* | 3/2011 | Hua | G02B 27/017 |
| | | | 359/464 |
| 2011/0298803 A1* | 12/2011 | King | A63F 13/25 |
| | | | 345/427 |
| 2015/0009304 A1* | 1/2015 | Linge | H04N 13/31 |
| | | | 348/51 |
| 2015/0201176 A1* | 7/2015 | Graziosi | H04N 13/111 |
| | | | 348/43 |
| 2015/0304625 A1* | 10/2015 | Seto | H04N 13/122 |
| | | | 348/44 |
| 2017/0324950 A1 | 11/2017 | Du | |

* cited by examiner

LIGHT FIELD DISPLAY CONTROL METHOD AND APPARATUS, AND LIGHT FIELD DISPLAY DEVICE

CROSS REFERENCE TO RELATED APPLICATION

The present application is based on and claims the benefit of priority to Chinese Application No. 201511029526.3, filed on Dec. 31, 2015, the entire contents of which are incorporated herein by reference.

TECHNICAL FIELD

The present application relates to the field of light field display technologies, and in particular, to a light field display control method and apparatus, and a light field display device.

BACKGROUND

A light field display technology was proposed early in the $20^{th}$ century, and two representative implementation manners of the light field display technology are: a lenslet array-based implementation manner proposed by Lippmann in 1908 and a parallax barriers-based implementation manner proposed by Ives in 1903. In recent years, as consumer electronics impose diversified requirements on display devices, the light field display technology is applied to different scenarios and devices, such as a 3D monitor, a wearable device, and a light field display device for vision correction. At present, the computing power and display resolution of electronic devices gradually match with a hardware resource requirement of the light field display technology, which provides desirable support for the promotion and application of the light field display technology.

By means of a hardware structure similar to that of a conventional light field display technology, the light field display technology can implement relatively flexible display effects, such as light field 3D display, light field projection display, light field near-to-eye display on a wearable device, and vision correction by means of light field display.

SUMMARY

The following provides a brief summary about the present application, so as to provide basic comprehension about some aspects of the present application. It should be understood that, the summary is not an exhaustive summary of the present application. It is neither intended to determine the key part or important part of the present application nor intended to limit the scope of the present application. The objective thereof is merely to provide some concepts in a simplified form, to serve as a prelude for subsequent more detailed descriptions.

The present application provides a light field display control method and apparatus and a light field display device.

According to a first aspect, an embodiment of the present application provides a light field display control method, comprising:

determining a partial depth distribution sub-region of content according to at least depth distribution information of the content; and adjusting a focal length of a first lenslet according to at least a display depth of field (DoF) range of a light field display device and the depth distribution sub-region, wherein the first lenslet is a lenslet that is in a lenslet array of the light field display device and affects display of a first object, and the first object is a part, which is located in the depth distribution sub-region, of the content.

According to a second aspect, an embodiment of the present application further provides a light field display control apparatus, comprising:

a depth distribution sub-region determining module, configured to a partial depth distribution sub-region of content according to at least depth distribution information of the content; and a focal length adjustment module, configured to adjust a focal length of a first lenslet according to at least a display DoF range of a light field display device and the depth distribution sub-region, wherein the first lenslet is a lenslet that is in a lenslet array of the light field display device and affects display of a first object, and the first object is a part, which is located in the depth distribution sub-region, of the content.

According to a third aspect, an embodiment of the present application provides another light field display control apparatus, comprising:

a processor, a communications interface, a memory, and a communications bus, wherein the processor, the communications interface, and the memory communicate with each other by means of the communications bus;

the memory is configured to store at least one instruction, and the instruction causes the processor to perform the following operations:

determining a partial depth distribution sub-region of content according to at least depth distribution information of the content; and adjusting a focal length of a first lenslet according to at least a display DoF range of a light field display device and the depth distribution sub-region, wherein the first lenslet is a lenslet that is in a lenslet array of the light field display device and affects display of a first object, and the first object is a part, which is located in the depth distribution sub-region, of the content.

According to a fourth aspect, an embodiment of the present application provides a light field display device, comprising:

a monitor;

a lenslet array, wherein the lenslet array comprises multiple lenslets with adjustable focal lengths distributed in the array; and any light field display control apparatus described above, wherein the light field display control apparatus is connected to the monitor and the lenslet array.

In the embodiments of the present application, a focal length adjustable feature of a lens is fully utilized; the focal length of the first lenslet may be adjusted according to a current display DoF range of the light field display device and a depth distribution sub-region on which image quality control needs to be performed; a display image distance of the first object in space is changed by adjusting the focal length of the first lenslet, so that an average display image distance of a virtual image which is formed after the first object is displayed by the first lenslet is distributed in the current display DoF range of the light field display device as far as possible, thereby improving display quality of the first object displayed by the first lenslet. This solution can avoid complex computation on source content of a light field, and display quality of a same object can be adjusted by adjusting a focal length of a corresponding lenslet. The solution is simple and easy to control.

Through the following detailed description of optional embodiments of the present application with reference to the accompanying drawings, these and other advantages of the present application will be clearer.

BRIEF DESCRIPTION OF THE DRAWINGS

The present application may be better comprehended with reference to the following description provided in combination with the accompanying drawings, wherein same or similar reference numerals are used in all the accompanying drawings to represent same or similar components. The accompanying drawings together with the following detailed description, which are incorporated in the specification and form a part of the specification, are used to further illustrate the optional embodiments of the present application and explain the principle and advantage of the present application. In the accompanying drawings.

Figure 1:
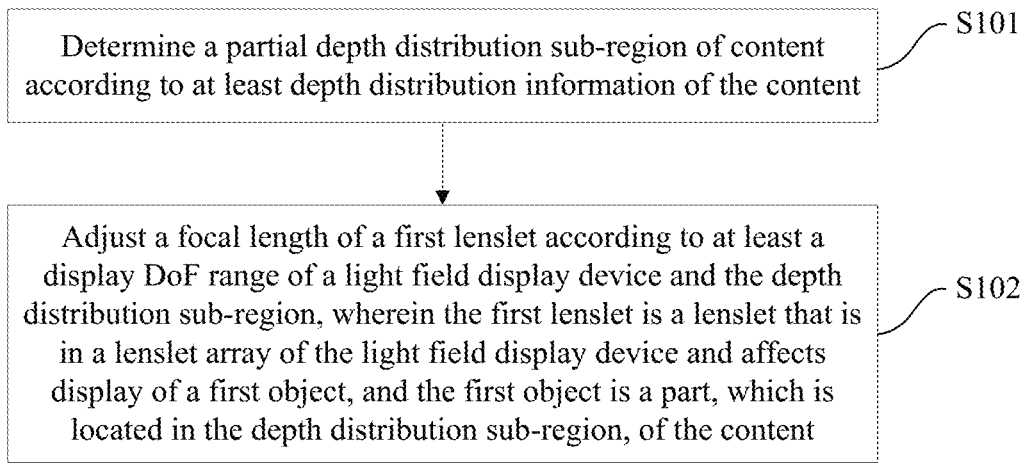
FIG. 1 is a flowchart of a light field display control method according to an embodiment of the present application.

A person skilled in the art should understand that, elements in the accompanying drawings are merely shown for the purpose of simplicity and clarity, but are not necessarily drawn proportionally. For example, sizes of some elements in the accompanying drawings may be enlarged relative to other elements, to help understand the embodiments of the present application.

DETAILED DESCRIPTION

Exemplary embodiments of the present application are described in detail in the following through the accompanying drawings. For clarity and simplicity, not all features of actual implementation manners are described in the specification. However, it should be understood that in a process of developing any such actual embodiment, many decisions specific to the implementation manner need to be made to implement specific objectives of developers, for example, meeting restrictive conditions related to a system and service, and the restrictive conditions may vary according to different implementation manners. Moreover, it should be further understood that, although the development work may be very complex and time consuming, the development work is merely a routine task for a person skilled in the art who is benefited from the content of the present disclosure.

Here, it should be further noted that, to prevent the present application from being blurred by unnecessary details, merely apparatus structures and/or processing steps closely related to the solutions of the present application are described in the accompanying drawings and the specification, and expressions and descriptions about components and processing that are less related to the present application and known by a person of ordinary skill in the art are omitted.

Specific implementation manners of the present application are further described in detail with reference to the accompanying drawings (same reference numerals in several accompanying drawings represent same elements) and embodiments. The following embodiments are used to describe the present application, but are not intended to limit the scope of the present application.

A person skilled in the art should understand that terms such as "first" and "second" in the present application are merely used to distinguish different steps, devices, modules or the like, and the terms neither represent any specific technical meanings nor indicate necessary logic orders between them.

FIG. 1 is a flowchart of a light field display control method according to an embodiment of the present application. The light field display control method provided in an embodiment of the present application may be executed by a light field display control apparatus, and the light field display control apparatus may execute the light field display control method in application programs that comprise but not limited to: image presentation, video playback, and the like, to perform image display control. A device manifestation form of the light field display control apparatus is not limited. For example, the light field display control apparatus may be an independent component, and the component is in coordination and communication with a light field display device; or the light field display control apparatus may be integrated in a light field display device as a functional module, and the light field display device may comprise but not limited to: an electronic device having a light field display capability. For example, the light field display device may comprise but not limited to: a near-to-eye light field display device, and the near-to-eye light field display device may comprise but not limited to: a smart helmet, smart glasses, and the like. Specifically, as shown in FIG. 1, a light field display control method provided in an embodiment of the present application comprises:

S101: Determine a partial depth distribution sub-region of content according to at least depth distribution information of the content.

The content is content being displayed or to be displayed. The depth distribution information of the content means distribution information about various parts of the content in a depth direction when the content is in a displayed state. The partial depth distribution sub-region may be determined according to at least the depth distribution information of the content, as a depth distribution sub-region on which display quality control needs to be performed.

S102: Adjust a focal length of a first lenslet according to at least a display DoF range of a light field display device and the depth distribution sub-region, wherein the first lenslet is a lenslet that is in a lenslet array of the light field display device and affects display of a first object, and the first object is a part, which is located in the depth distribution sub-region, of the content.

Figure 2A:
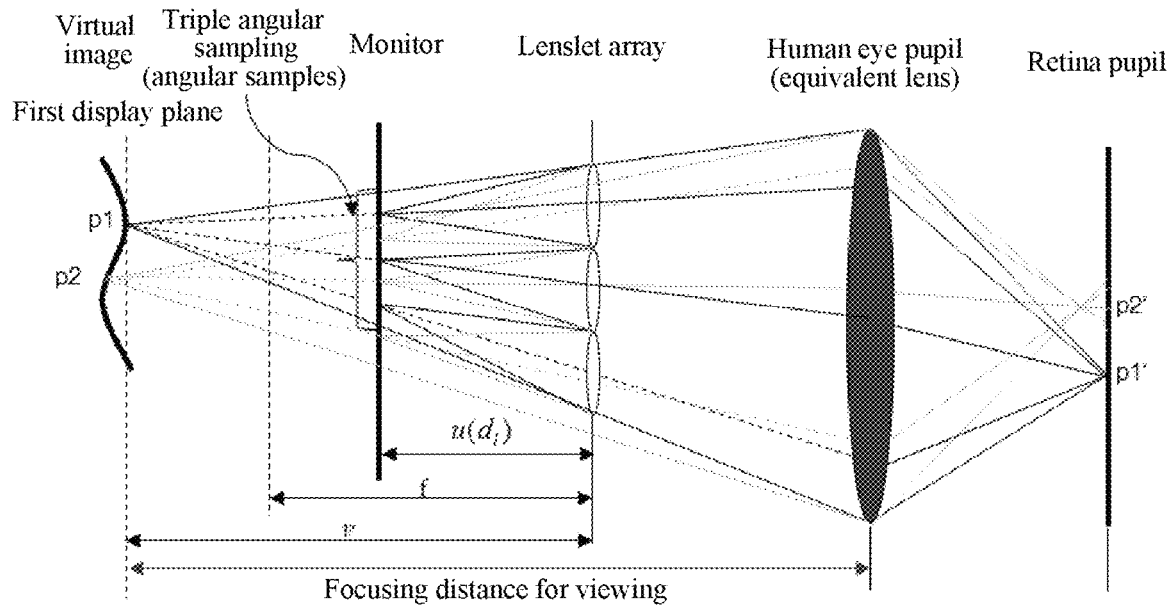
FIG. 2a illustrates a first example of a light field display device and light field display thereof according to an embodiment of the present application.

The light field display device comprises a monitor and a lenslet array that are arranged close to each other, as shown in FIG. 2a. The monitor may be a continuous monitor or the monitor may be a screen formed by multiple connected display units that are distributed in an array, wherein the monitor may be divided into multiple display sub-regions when displaying content, each display sub-region comprises multiple display pixels distributed in an array, each display sub-region can display a sub-image, and the sub-image is a part of an image of the content. The lenslet array may also be referred to as a micro-lens array, and comprises multiple lenslets (or referred to as micro lenses) distributed in an array. A propagation direction of a light ray from the monitor is changed by at least one lenslet in the lenslet array, and the light ray with the changed propagation direction forms an image on a retina of a user after passing through an eye of the user (similar to a lens). If a partial image formed on the retina is a relatively small average circle of confusion, it is equivalent to that the user can see a clear virtual image which is displayed in space and corresponds to the partial image. On the contrary, if a partial image formed on the retina has a relatively large average circle of confusion, it is equivalent to that the user sees a vague virtual image which is displayed in space and corresponds to the partial image. In addition, because the monitor and the lenslet array are arranged close to each other (wherein it should be noted that, a relative distance between components in the figure merely provides an exemplary illustration, and does not represent an actual distance between the components), the light ray whose propagation direction has been changed by the at least one lenslet forms a virtual image on a side, which is away from the user, of the monitor. This virtual image corresponds to the image formed on the retina of the user, and is equivalent to an image seen by a human eye through the lenslet array; the virtual image may present a certain depth distribution in space, and the distribution of a circle of confusion of the virtual image in a current first display plane of the light field display device corresponds to the distribution of a circle of confusion of the image formed on the retina. For example, if some part of the virtual image has a relatively large average circle of confusion in the first display plane, an image of this part formed on the retina also has a relatively large average circle of confusion, and vice versa.

In a light field display process, the content displayed by the light field display device has a display DoF range in space, wherein the display DoF range is a range that has a particular depth width in a depth direction, and the range comprises a depth position of the first display plane; the first display plane is a display plane that is corresponding to a focusing distance for viewing in the depth direction and perpendicular to the depth direction. The focusing distance for viewing may be a default human eye focusing distance (for example, it is considered by default that an optimal distance for viewing a virtual image formed in the first display plane is 25 cm, and at this viewing distance, a human eye can clearly see the virtual image formed in the first display plane; in other words, a clearly image of the content displayed by the first display plane can be formed on the retina of the human eye located at the focusing distance for viewing). Alternatively, the focusing distance for viewing may be an actual human eye focusing distance, or the like. In an actual application, after a suitable focusing distance for viewing is determined, the first display plane corresponding to the focusing distance for viewing can be determined. A near-to-eye light field display device is used as an example for description. When the near-to-eye light field display device is used (for example, wearing smart glasses having a light field display capability) to watch the displayed content, a distance L between the human eye and the near-to-eye light field display device is relatively fixed. A difference value between the focusing distance for viewing and the distance L is calculated, and a depth position corresponding to the difference value is determined in the depth direction, wherein this depth position is the depth position of the first display plane. After the first display plane is determined, the display DoF range of the light field display device may be determined. For example, a permissible circle of confusion may be determined according to one or more parameters of a display quality expectation, a human eye characteristic, and the like; average imaging circles of confusion at different distances from the first display plane in the depth direction are calculated; and a continuous depth range, which comprises the depth position of the first display plane and of which an average imaging circle of confusion is less than the permissible circle of confusion, is determined as the display DoF range. Further, the display DoF range may be optimized with reference to the visual sensitivity of a human eye to the clearness of content displayed at different depths. For example, the human eye is more visually sensitive to the clearness of content displayed at a near place than to the clearness of content displayed at a further place. Therefore, with reference to the depth position of the first display plane, a permissible circle of confusion at a depth position close to the depth position of the first display plane may be determined as a lower permissible circle of confusion threshold (C1), and a permissible circle of confusion at a depth position away from the depth position of the first display plane may be determined as an upper permissible circle of confusion threshold (C2), thereby determining the display DoF range. The determined display DoF range is expressed as a particular depth range that comprises the depth position of the first display plane and that is asymmetrically distributed along the depth position of the first display plane. Certainly, the foregoing method for determining the first display plane and the display DoF range is merely an illustrative description, and a person skilled in the art can also use other determining methods, which are not limited in the embodiments of the present application. A virtual image displayed in the display DoF range is very clearly for a human eye at the focusing distance for viewing corresponding to the first display plane, while a virtual image displayed outside the display DoF range is very vague for a for a human eye at the focusing distance for viewing corresponding to the first display plane.

During implementation of the embodiments of the present application, the inventor of the present application finds that, if the clearness of different parts of the content needs to be adjusted, the current first display plane of the light field display device may be adjusted, and after the first display plane is changed, it is equivalent to that the display DoF range of the light field display device is re-determined. A part clearly displayed by the light field display device can be adjusted based on the depth distribution information of the displayed content and the re-determined display DoF range. For example, content that is clearly displayed by the light field display device currently is a foreground part having a relatively small depth, and by adjusting the first display plane, the content clearly displayed content can be changed to be a background part having a relatively large depth, or the like. To re-determine the first display plane, source content displayed by the light field display device needs to be processed. This requires a large amount of computation, the computation is highly complex, and the display speed is low. Therefore, the present application provides a new solution.

The inventor notices that some types of lenses have a focal length adjustable feature. In the embodiment of the present application, the focal length adjustable feature of the lens is fully utilized: a focal length of the first lenslet may be adjusted (wherein the first lenslet is a lens with an adjustable focal length) according to at least a current display DoF range of the light field display device and a depth distribution sub-region on which image quality control needs to be performed; a display image distance of the first object in space is changed by adjusting the focal length of the first lenslet, so that an average display image distance of a virtual image which is formed after the first object is displayed by the first lenslet is distributed in the current display DoF range of the light field display device as far as possible, thereby improving display quality of the first object displayed by the first lenslet. A near-to-eye light field display is used as an example for description. Assuming that a distance between the first display plane and a human eye is 25 cm (that is, the focusing distance for viewing is 25 cm), an image formed in a particular depth range of the first display plane (that is, the display DoF range), for example, the depth range of [25 cm−5 cm, 25 cm+7 cm], is clear to the human eye, and if a user wants to see an image outside the display DoF range, for example, if the user wants to clearly see an image near a position that is 35 cm away from the human eye, a focal length of a corresponding lenslet may be adjusted, so that images of a same object are all displayed in the display DoF range, thereby improving the display clearness of the object, to allow the user to see the object clearly. This solution can avoid complex computation on source content of a light field, and display quality of a same object can be adjusted by adjusting a focal length of a corresponding lenslet. The solution is simple and easy to control. Besides, in the present application, on the basis of an existing display pixel resource of the light field display device, a technical means is provided to clearly display, in a partial depth distribution sub-region, an object which otherwise would not be clearly displayed in some cases limited by the display pixel resource. The solution is simple and easy to control.

The first lenslet is a lenslet that is in the lenslet array of the light field display device and affects display of the first object. The first object is a part, which is in the depth distribution sub-region, of the content, and if the content is regarded as a complete display image, the first object is a part of the complete display image. Display of the first object may be affected by one or more lenslets. Therefore, in an actual application, there may be one or more first lenslets. The focal length of the first lenslets may be adjusted, so as to improve the clearness of the displayed first object and improve display quality.

The first lenslet is a lens with an adjustable focal length, and the lens with an adjustable focal length has features of being light and thin, can be integrated into various types of mobile devices easily, is especially suitable for wearable devices (such as a near-to-eye display device) having a high requirement on thickness and weight, and has a wide application range. By changing a characteristic of a material in the lens, a phase of light passing through the lens can be changed, thereby implementing adjustment on an equivalent focal length of the lens.

Figure 3A:
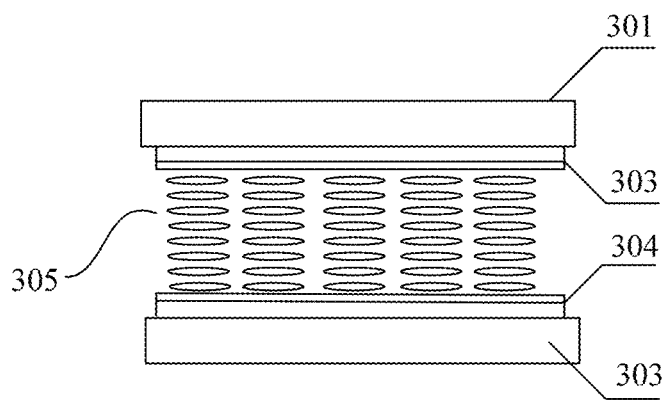
FIG. 3a illustrates an optional structure example of a liquid crystal lens according to an embodiment of the present application.
Figure 3B:
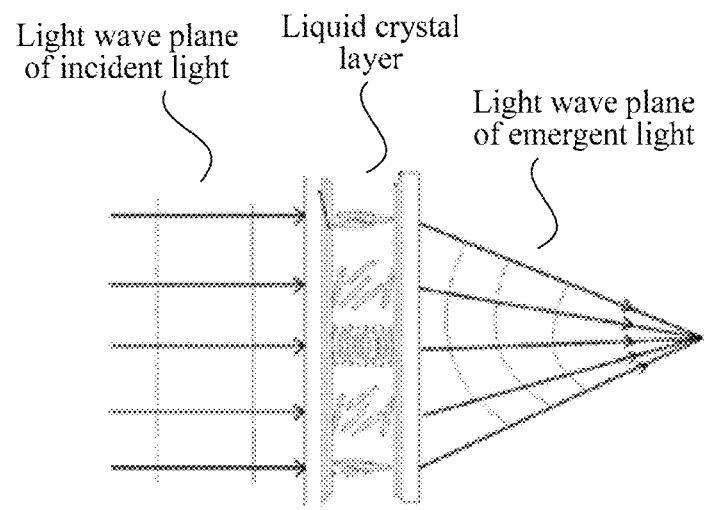
FIG. 3b illustrates an optional optical path example of a liquid crystal lens according to an embodiment of the present application.

Optionally, the lens with an adjustable focal length may be a liquid crystal lens, and by means of an external field such as an electric field or a magnetic field acting on the liquid crystal lens, a spatial distribution of liquid crystal molecules in the liquid crystal lens can be changed, thereby changing an optical path of incident light entering the liquid crystal lens, which is equivalent to adjusting the focal length of the lens. An optional liquid crystal lens structure is shown in FIG. 3a and FIG. 3b, comprising: two substrates 301 and 302 that are arranged in parallel along a vertical direction, wherein a liquid crystal layer 305 is arranged between the two substrates 301 and 302. On a side close to the liquid crystal layer 305, the substrates are provided with respective control layers 303 and 304. An electric field and/or a magnetic field is exerted by using the control layers 303 and 304, and the exerted electric field and/or magnetic field produces non-uniformly distributed anchoring energy in the liquid crystal layer 305. The energy can cause a change in a distribution of polarization directions of liquid crystal molecules in different parts of the lens. In this way, after parallel incident light rays pass through different parts of the lens and exit from the lens, different phase differences are formed, which is equivalent to adjusting the equivalent focal length of the lens. In an actual application process, a non-uniform external field may be exerted by means of the control layer, so as to produce non-uniformly distributed anchoring energy in different parts of the liquid crystal layer; or a uniform external field (such as a uniform electric field and/or magnetic field) may be exerted by means of the control layer, and then non-uniformly distributed anchoring energy may be produced in the liquid crystal layer in at least one of, but not limited to, the following manners: the control layer has an alignment layer with a non-uniform thickness distribution or a polarization layer with a non-uniform thickness distribution; optionally, the alignment layer with a non-uniform thickness distribution may comprise a photosensitive material, and with non-uniformly distributed illumination, different parts of the alignment layer can receive non-uniformly distributed anchoring energy intensity; or optionally, the different materials may be used in different regions of the alignment layer by means of a half-tone treatment technique, and after an external field is exerted on the alignment layer, anchoring energy with a differentiated distribution can be formed. A non-uniform distribution manner of the anchoring energy formed in the lens is, for example: the anchoring energy increasing or decreasing, in a radial manner, step by step from a central position of the lens to a peripheral position of the lens.

Figure 4A:
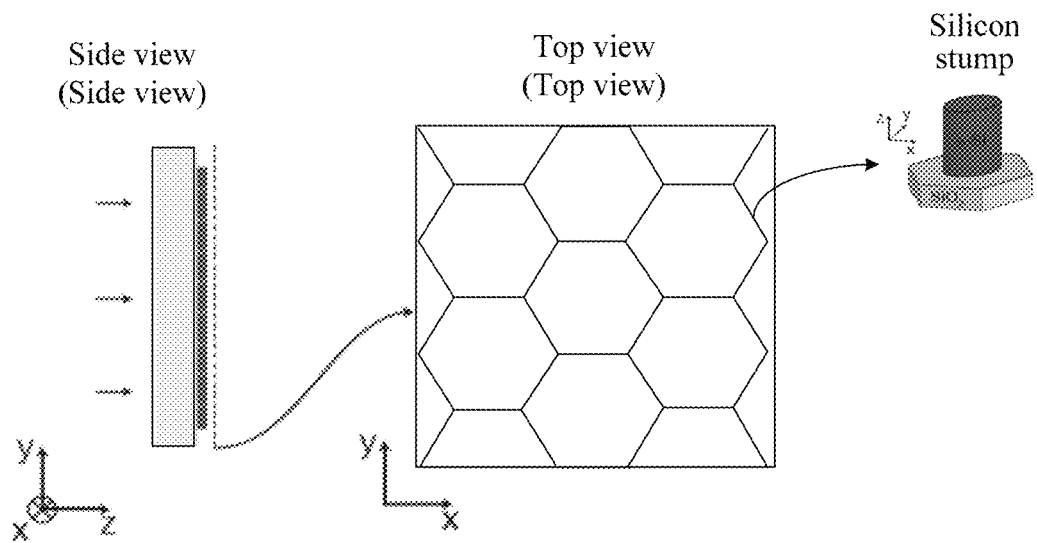
FIG. 4a illustrates an optional structure example of a metasurface lens (silicon stump lens) according to an embodiment of the present application.
Figure 4B:
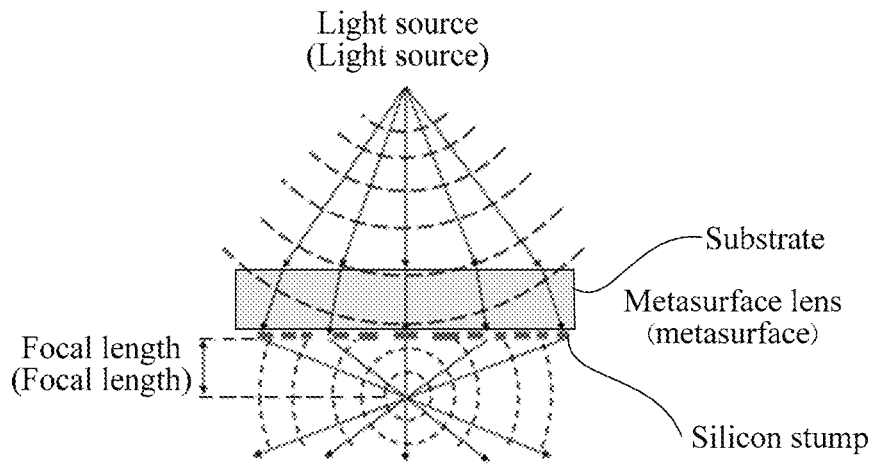
FIG. 4b illustrates an optional optical path example of an equivalent focal length adjustment of a metasurface lens according to an embodiment of the present application.

Optionally, the lens with an adjustable focal length may be a metasurface optical device. The metasurface optical device is a planar ultra-thin optical device, and is designed to break the dependency of the wavefront shaping on a propagation effect, so that the phase, amplitude and/or polarization characteristics of an optical wave mutate in a very short distance. The metasurface optical device usually consists of a series of micro anisotropic scatterers, wherein optical responses of the scatterers thereof produce a spatial difference. For example, the metasurface optical device may be but not limited to: a silicon stump lens, as shown in FIG. 4a, wherein a lens plane of the silicon stump lens comprises multiple pixel points arranged like a honeycomb, and each pixel point is a nano stump; each nano stump comprises a base (such as a $SiO_2$ base) and amorphous silicon (elliptical amorphous silicon post) formed on the base, and a cross section of the amorphous silicon is usually elliptical. Each silicon stump may be regarded as an optical waveguide structure. For incident optical waves at a same angle, different diameters and orientations of elliptical cross sections of silicon stumps bring different effective refractive indexes. Generally, as shown in FIG. 4b, a larger angle between the orientation of the silicon stump and an incident optical wave indicates a greater change in refraction, that is, the phase, of the incident optical wave; for a same incident optical wave, different refractive indexes mean different focusing distances. For example, after light rays of a light source that is 600 um away from the silicon stump lens pass through silicon stumps having a diameter of 400 um and having different orientations, a range of a distance (focusing distance) from a convergence point to the plane of the silicon stump lens may be 50 um to 500 um. In an actual application, a single silicon stump or the whole plane of the silicon stump lens may be rotated to change the phase of an incident optical wave, wherein a corresponding relationship between rotation angles and phase changes may be learned in advance, and therefore, a phase difference between emergent light and incident light can be correspondingly changed by controlling a rotation angle of the silicon stump or the silicon stump lens, which is equivalent to adjusting the focal length of the silicon stump lens.

It should be noted that, a specific structure of the lens with an adjustable focal length may be selected or designed according to an actual requirement, which belongs to the prior art. The lens structure above is merely an optional structure of a lenslet in the light field display device, and should not be construed as a substantial limitation to the technical solution of the embodiments of the present application. In other words, on the basis of the technical solution of the present application, a person skilled in the art may select another lens with an adjustable focal length as a lenslet in the lenslet array, which is not limited in the embodiment of the present application.

In the embodiment of the present application, display quality of partial content in light field display is adjusted by using a focal length adjustable feature of a lens, and a specific structure of the lens with an adjustable focal length is not limited.

When the first object is displayed by using, for example, the light field display device, affected by factors such as the property of an optical wave and an aberration, imaging light rays of points on the object usually cannot be converged at one point, but form a diffusion projection in a shape of a circle or an ellipse or in another circle-like shape, which is referred to as a circle of confusion, also known as disk of confusion, circle of indistinctness, blur circle, or blur spot. The size of a circle of confusion for imaging of a point may be calculated according to the following formula:

$$c_a = \frac{|d_a - d_0|}{d_a} E \qquad (1)$$

In the formula above: E represents a size of a human eye pupil, for example, a diameter of a human eye pupil; $d_a$ represents a focusing distance for viewing, that is, a distance between a current first display plane of a light field display device and the human eye pupil; $d_0$ represents a display depth of an object, for example, an average distance, in a depth direction, between a virtual image of the object and a human eye located at the focusing distance for viewing; $c_a$ represents a size of a circle of confusion (for example, a diameter of a circle of confusion) generated during imaging, at the human eye, of an image point having a display depth of $d_0$.

Figure 2B:
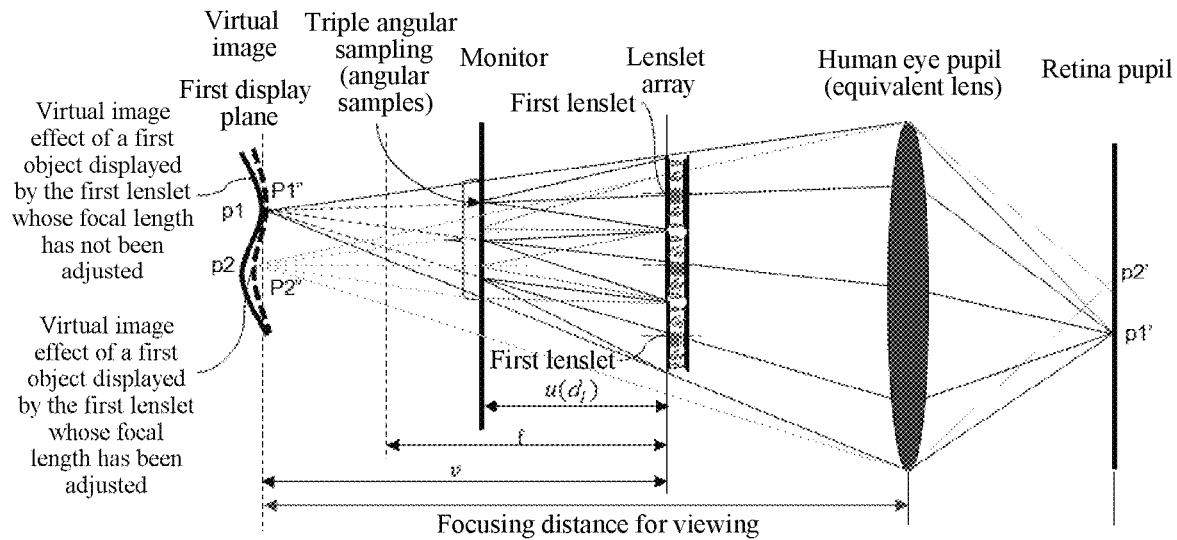
FIG. 2b illustrates a second example of a light field display device and light field display thereof according to an embodiment of the present application.

A circle of confusion distribution, which is in the first display plane of the light field display device, of a virtual image that is formed in space after the first object is displayed by the first lenslet whose focal length has been adjusted corresponds to a circle of confusion distribution, which is on the retina, of an image that is formed on the retina after the virtual image undergoes an equivalent lens effect of the human eye. Usually, if a circle of confusion has a relatively small size, an image of an object corresponding to the circle of confusion is relatively clear, and can be regarded as an in-focus image of the point with respect to the human eye, wherein the image is clear; correspondingly, if a size of a circle of confusion exceeds a particular permissible range, an image of an object corresponding to the circle of confusion is relatively vague. In the embodiment of the present application, the focal length of the first lenslet is adjusted, and a convergence condition for focal length adjustment control on the first lenslet is as follows: an average circle of confusion of an image, which is formed on the first display plane of the light field display device or on the retina after the focal length of the first lenslet is adjusted, is less than or equal to a permissible circle of confusion, so that an average circle of confusion of images, which are formed on the first display plane of the light field display device or on the retina, of points in the first object displayed by the first lenslet whose focal length has been adjusted is less than or equal to a permissible circle of confusion. As shown in FIG. 2b, an average circle of confusion of a retina image, which corresponds to a virtual image of the first object displayed by the first lenslet whose focal length has been adjusted, is reduced, and therefore average clearness of points in the first object is improved. It should be noted that, the term "points in the first object" expresses a relative concept, for example, a part displayed by an individual display pixel in the monitor may be used as a point in the first object, which is not limited in the embodiments of the present application.

In any technical solution provided in the embodiments of the present application, the manner for determining the depth distribution sub-regions on which display quality needs to be controlled is very flexible.

For example, the depth distribution information of the content and interest information may be combined to determine the depth distribution sub-region, that is, region of interest (ROI) information and the depth distribution information may be acquired, and the depth distribution sub-region may be determined according to the ROI information and the depth distribution information. The manner for acquiring the ROI information may depend on an actual requirement, and is very flexible. For example, degree of interest indication information of the content may be acquired, and the ROI information is determined according to the degree of interest indication information. The degree of interest indication information may be acquired from a user or a device, and used as a basis for determining the ROI information of the content. Content and an expression manner of the degree of interest indication information may be determined according to an actual requirement, and the degree of interest is used to represent a relative value indicating how much the user or device is interested in different depth sub-regions of the content; the user or device usually has a high degree of interest in an ROI of the content, and usually has a low degree of interest in a non-ROI. The ROI may comprise but not limited to one or more of the following types: at least one area of the content that the user selects (that is, a user selected region of the content), at least one area of the content that the user gazes at (that is, a user gaze region of the content), and the like. In this solution, the depth distribution information of the content and the interest information are combined to determine a partial depth distribution sub-region of the content as the depth distribution sub-region on which display quality control needs to be performed, so that the determining of the depth distribution sub-region fits an actual requirement of the user more desirably, and a personalized application requirement of the user can be better satisfied.

For another example, the depth distribution information of the content and image analysis on the content may be combined to determine the depth distribution sub-region, that is, image analysis may be performed on the content, and the depth distribution sub-region is determined according to a result of the image analysis and the depth distribution information. For example: human body recognition is performed on the content, a relatively high degree of interest is assigned to a depth distribution sub-region, which corresponds to a human body, of the content according to a result of the recognition, a relatively low degree of interest is assigned to areas of other depths in the content, and the like. In this solution, the result of the image analysis on the content and the depth distribution information of the content are combined to automatically determine the depth distribution sub-region on which display quality control needs to be performed, so that the determining of the depth distribution sub-region is more intelligent, and the efficiency and universality of determining the depth distribution sub-region are improved.

After the depth distribution sub-region is determined, the focal length of the first lenslet may be adjusted according to at least the display DoF range of the light field display device and the depth distribution sub-region. Optionally, the adjusting the focal length of the first lenslet according to at least the display DoF range of the light field display device and the depth distribution sub-region comprises: determining expected display depth information of the first object according to the display DoF range and the depth distribution sub-region; and adjusting the focal length of the first lenslet according to at least the expected display depth information. The expected display depth information represents an expected average display depth or an expected average display image distance of all points of the first object, that is, a distance between the first lenslet and an image which is formed after imaging light rays of the first object passes through the first lenslet. In an actual application process, a particular depth sub-range or a particular depth position in the display DoF range may be determined as the expected display image distance of the first object based on the trade-off between the display DoF range of the light field display device and the depth distribution sub-region, and then the focal length of the first lenslet is adjusted according to at least the expected display depth information, so that image distance information of the first object displayed by the first lenslet whose focal length has been adjusted is close to the expected display depth information as much as possible or even matches the expected display depth information, thereby improving display quality of the first object.

The method for determining the expected display depth information is very flexible, and is not limited in the embodiment of the present application.

Optionally, the determining expected display depth information of the first object according to at least the display DoF range comprises: determining any display depth in the display DoF range as the expected display depth information of the first object. For example, the display DoF range of the light field display device is $[V_{close}, V_{far}]$, and a display depth in the display DoF range may be determined as the expected display depth information of the first object, that is, expected display depth information $\nabla'\varepsilon[V_{close}, V_{far}]$ of each point in the first object. In an actual application, a preferable display depth in the display DoF range may be determined as the expected display depth information of the first object according to one or more factors such as a focal length adjustment capability of the first lenslet and a relative distribution of objects in different depth distribution sub-regions of the content, and the expected display depth information is used as a basis for focal length adjustment of the first lenslet, thereby improving the flexibility of solution implementation.

Optionally, the determining expected display depth information of the first object according to at least the display DoF range comprises: determining a display depth, which is in the display DoF range and close to the depth distribution sub-region, as the expected display depth information of the first object according to a relative distribution of the depth distribution sub-region and the display DoF range in the depth direction. The term "close to" is a relative concept taking a permissible range into consideration, and in an actual application, the expected display depth information may be determined with reference to a depth position $V_{focus}$ of a current display focus plane of the light field display device. For example, if the depth distribution sub-region corresponding to the first object is located at a relatively deep area with respect to the display DoF range, a display depth in the range of $[V_{focus}, V_{far}]$ (for example, a depth position as close to $V_{far}$ as possible in the range of $[V_{focus}, V_{far}]$) may be determined as the expected display depth information of the first object; if the depth distribution sub-region corresponding to the first object is located at a relatively shallow area with respect to the display DoF range, a display depth in the range of $[V_{focus}, V_{far}]$ (for example, a depth position as close to $V_{close}$ as possible in the range of $[V_{focus}, V_{far}]$) may be determined as the expected display depth information of the first object. By means of such processing, a relative relationship of display depths between objects, of the content, distributed at different depths can be kept unchanged as far as possible. An object having a greater depth has a greater display image distance than an object having a smaller depth, so that the sense of depth when the user watches the image is not reduced while the display clearness is improved, thereby improving user experience.

Further, an implementation manner of the adjusting the focal length of the first lenslet according to at least the expected display depth information is very flexible. For example, the focal length of the first lenslet is adjusting by means of successive approximation through multiple times of adjustment. For another example, an expected focal length of the first lenslet may be determined according to the expected display depth information and a distance between the monitor and the lenslet array in the light field display device, and the focal length of the first lenslet is adjusted according to at least the expected focal length. Referring to FIG. 2a and FIG. 2b, the expected focal length may be determined according to a classical optical imaging formula:

$$\frac{1}{u}+\frac{1}{v}=\frac{1}{f} \quad (2)$$

v represents an average image distance, that is, the expected display depth information $\nabla$'; u represents an object distance, that is, a distance between the monitor and the first lenslet, and is equivalent to a distance $d_1$ between the monitor and the lenslet array; f represents an expected focal length of the first lenslet. After the expected focal length of the first lenslet is determined, the focal length of the first lenslet is adjusted according to at least the expected focal length, thereby improving the efficiency and pertinence of focal length adjustment of the first lenslet.

A manner for adjusting the focal length of the first lenslet is very flexible. For example, in the technical solution provided in the embodiment of the present application, during the focal length adjustment process of the first lenslet, the focal length of the first lenslet may be adjusted in a manner of changing, by means of an external field, a phase difference that is formed after incident light passes through different parts of the first lenslet. For example, the adjusting the focal length of the first lenslet according to at least the expected focal length comprises: determining, according to at least the expected focal length, a phase difference that is formed after incident light passes through different parts of the first lenslet; determining, according to a mapping relationship between phase differences and external fields, an external field corresponding to the phase difference; and changing, by means of the external field, the phase difference that is formed after the incident light passes through the different parts of the first lenslet, so as to adjust the focal length of the first lenslet. The external field may be determined according to a material characteristic of the lens. For example, the external field may comprise but not limited to: an electric field, a magnetic field, and a light field. When the external field acts on the first lenslet, it can cause the material characteristic of the first lenslet to change, for example, causing a polarization direction distribution of liquid crystal molecules in a liquid crystal lenslet to change, or causing orientations of silicon stumps in a silicon stump lenslet to change, so that a particular phase difference is formed after incident light passes through different parts of the first lenslet; because there is a particular corresponding relationship between phases and focal lengths, a phase change is equivalent to a focal length adjustment. It can be seen that, in this solution, it is unnecessary to move or tilt the first lenslet in the light field display device; instead, the material characteristic of the first lenslet is fully utilized to implement focal length adjustment. Therefore, this helps simplify a system mechanical structure, and can meet integration requirements of devices that comprise but not limited to: light, thin, and portable devices; besides, this solution is simple and easy to implement, which improves control efficiency of the focal length adjustment of the first lenslet.

The first lenslet being a liquid crystal lens (which is referred to as a first liquid crystal lenslet) is used as an example to describe an optional implementation manner of determining the phase difference. Optionally, the determining, according to at least the expected focal length, a phase difference that is formed after incident light passes through different parts of the first lenslet comprises: determining, according to the expected focal length, a radius of the first liquid crystal lenslet, and a wavelength of the incident light, a phase difference that is formed after the incident light passes through different parts of the first liquid crystal lenslet. This solution of determining the phase difference is simple and easy to implement. Optionally, the focal length and the phase difference satisfy the following corresponding relationship:

$$f = \frac{\pi r^2}{\Delta \phi \lambda} \quad (3)$$

In the formula above, f represents an expected focal length of the first liquid crystal lenslet; r is a radius of the first liquid crystal lenslet; $\Delta\varphi$ represents a phase difference that is formed after light passes through different parts of the first liquid crystal lenslet, for example, a phase difference that is formed after light passes through a central part and a peripheral part of the first liquid crystal lenslet; $\lambda$ represents a wavelength of the light.

After the phase difference corresponding to the expected focal length is determined, because there is a particular correspondence between phase differences and external fields, a required external field can be determined according to the corresponding relationship. Specifically, according to the structure of the first lenslet, a mapping relationship between phase difference and electric fields (for example, voltage values of uniform electric fields or distributions of non-uniform electric fields) may be acquired in advance, an electric field corresponding to the phase difference corresponding to the expected focal length can be determined according to the mapping relationship, and then a material characteristic of the first lenslet is changed (for example, changing a distribution of liquid crystal molecules in the first lenslet, or changing orientations of silicon stumps in a silicon stump lens) by means of an effect of the determined electric field, so that a phase difference formed by light passing through different parts of the first lenslet is close to the determined phase difference as much as possible or even equal to the determined phase difference, to make an equivalent focal length of the adjusted first lenslet is close to the expected focal length as much as possible or even equal to the expected focal length.

Optionally, the adjusting the focal length of the first lenslet according to at least the expected focal length comprises: determining a permissible focal length adjustment range of the first lenslet according to at least the expected focal length; and adjusting the focal length of the first lenslet according to at least the permissible focal length adjustment range. When the focal length of the first lenslet is adjusted by using this solution, the adjusted focal length of the first lenslet falls in the permissible focal length adjustment range. The permissible focal length adjustment range may be flexibly adjusted according to the expected focal length. For example, a difference between the expected focal lengths may be directly determined as a permissible difference range, or the expected focal length and a permissible adjustment capability of the first lenslet may be combined to determine the permissible focal length adjustment range. The permissible focal length adjustment range determined by using this solution is relatively reasonable, and focal length adjustment of the first lenslet performed based on the permissible focal length adjustment range is efficient and easy to implement.

Further optionally, the adjusting the focal length of the first lenslet according to at least the permissible focal length adjustment range comprises: determining, according to the permissible focal length adjustment range, a permissible phase difference range that is formed after incident light passes through different parts of the first lenslet; determining, according to a mapping relationship between phase differences and external fields, an external field corresponding to a permissible phase difference in the permissible phase difference range; and changing, by means of the external field, a phase difference that is formed after the incident light passes through the different parts of the first lenslet, so as to adjust the focal length of the first lenslet. A focal length in the permissible focal length adjustment range is a permissible focal length for adjustment, and when the adjusted focal length of the first lenslet falls in the permissible focal length adjustment range, an image distance of the first object displayed by the first lenslet whose focal length has been adjusted is close to the expected display depth information as far as possible or even matches the expected display depth information, thereby improving display quality of the first object. Each focal length of the first lenslet corresponds to a phase difference, and therefore, a permissible phase difference range corresponding to the permissible focal length adjustment range may be determined, and an external field corresponding to any phase difference in the permissible phase difference range may be determined as a control source for focal length adjustment of the first lenslet, thereby implementing required focal length adjustment for the first lenslet and improving the convenience and flexibility of the focal length adjustment control.

The first lenslet being a liquid crystal lens (which is referred to as a first liquid crystal lenslet) is used as an example to describe an optional implementation manner of determining the permissible phase difference range. Optionally, the determining, according to the permissible focal length adjustment range, a permissible phase difference range that is formed after incident light passes through different parts of the first lenslet comprises: determining, according to a maximum permissible focal length in the permissible focal length adjustment range, a radius of the first liquid crystal lenslet, and a wavelength of the incident light, a first phase difference that is formed after the incident light passes through different parts of the first liquid crystal lenslet; determining, according to a minimum permissible focal length in the permissible focal length adjustment range, the radius of the first liquid crystal lenslet, and the wavelength of the incident light, a second phase difference that is formed after the incident light passes through different parts of the first liquid crystal lenslet; and determining the permissible phase difference range according to the first phase difference and the second phase difference. A maximum permissible phase difference range can be obtained by using this solution, which helps improve the control efficiency and flexibility of focal length adjustment.

Optionally, before the first lenslet is adjusted, the method further comprises: determining a lenslet which is in the lenslet array and affects display of the first object as the first lenslet. By means of this solution, one or more lenslets, which are in the lenslet array of the light field display device and affect display of the first object, may be determined as the first lenslets, and then the focal length of the one or more first lenslets is adjusted, to adjust the display image distance of the first object displayed by the corresponding first lenslet, so that the display image distance falls in the display DoF range of the light field display device, thereby improving the display quality of the first object.

Figure 5:
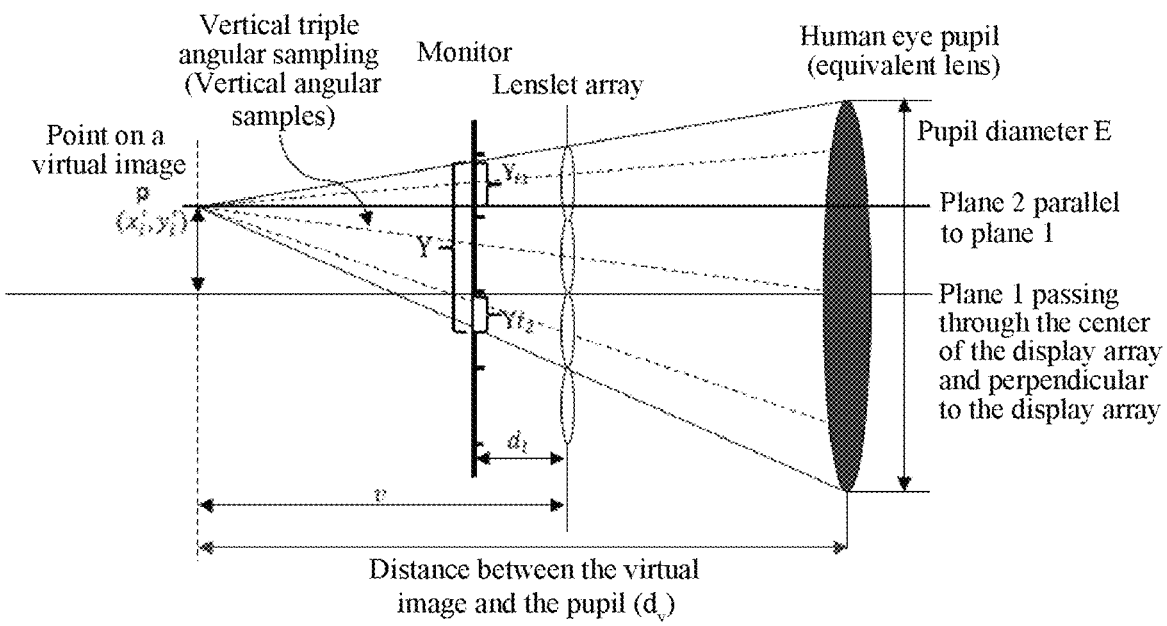
FIG. 5 illustrates an example of determining a first lenslet according to an embodiment of the present application.

Further optionally, the determining a lenslet which is in the lenslet array and affects display of the first object as the first lenslet comprises: determining a first display sub-region according to the expected display depth information, the focusing distance for viewing, and a pupil size of a human eye, wherein the first display sub-region is a display sub-region that is in the monitor of the light field display device and affects display of the first object; and determining, according to a mapping relationship between display sub-regions in the monitor and lenslets in the lenslet array, a lenslet which is in the lenslet array and corresponding to the first display sub-region as the first lenslet. In some cases of light field display, content displayed on the monitor and a virtual image that a user sees through a lenslet array are the same in terms of content but have different image expression forms. The virtual image that the user sees through the lenslet array is usually consistent with an image seen by a human eye in a natural environment, while the monitor displays multiple sub-images, each sub-image corresponds to a local part of the virtual image, and objects represented by different sub-images may be partially the same. For example, light field display is performed by means of triple angular sampling (that is, 3×3 display sub-regions are used to represent display information of a same object from different angles). For example, a same object such as a beak may be shown in 9 sub-images, lenslets corresponding to the display sub-regions that display the 9 sub-images may be determined as the first lenslets to be adjusted, and the focal lengths of the first lenslets are adjusted to improve the image clearness of the object. In an actual application, the first display sub-region may be determined, and then the first lenslet is further determined according to the first display sub-region. Optionally, referring to FIG. 5, determining a first lenslet that affects imaging of a point of the first object is used as an example for description, and the first lenslet may be determined by using the following method:

(a) Assuming that the content is a clear 2D image (wherein after light field display, the 2D image is displayed as a 3D image having a particular display depth distribution in space), image coordinates $\{(x_i, y_i)\}$, in the 2D image, of points in the first object in a partial depth distribution sub-region of the 2D image may be determined according to depth distribution information of the 2D image. It should be noted that, the determined image coordinates of the points may be in a concentrated distribution or in a dispersed distribution. A point in the first object is used as an example for description.

(b) According to the determined image coordinates of the point, space coordinates $p(x'_i, y'_i)$ of a virtual image point P corresponding to the point are determined, wherein $x'_i = M_1 x_i, y'_i$, M is a known scaling coefficient, for example, M1 is a known X-direction scaling coefficient and M2 is a known Y-direction scaling coefficient.

(c) The virtual image point P may be regarded as a virtual light source. Entering of a light ray emitted by the virtual light source into a human eye is related to a distance between the virtual light source and the human eye and the pupil size of the human eye, while the distance between the virtual light source and the human eye is equivalent to a display depth of the virtual image point P, and a diameter of the pupil of the human eye can be acquired in advance according to an empirical value, an experiment value, or a detected value. After the two pieces of information are determined, a light cone with the virtual image point P as a vertex is also determined correspondingly, and light rays in the light cone can enter the human eye. Therefore, light rays emitted by display sub-regions covered by a cross section between the monitor and the light cone may be regarded as light rays capable of entering the human eye, and these display sub-regions are display sub-regions that affect imaging of the virtual image point, namely, the first display sub-regions. Optionally, a coverage area of the virtual image point P on the monitor along a vertical direction may be determined according to formulas (4) and (5), thereby determining the first display sub-region according to the coverage area:

$$y_{min} = -Y_{i2} = \frac{(v-d_l)(0.5E - y'_i)}{d_v} + y'_i - \frac{(v-d_l)E}{d_v} \quad (4)$$

$$y_{max} = y'_i + Y_{i1} = \frac{(v-d_l)(0.5E - y'_i)}{d_v} + y'_i \quad (5)$$

$$\frac{Y}{E} = \frac{v-d_l}{d_v} \quad (6)$$

$$\frac{Y_{i1}}{0.5E - y'_i} = \frac{v-d_l}{d_v} \quad (7)$$

$$Y_{i2} = Y - Y_{i1} - y'_i \quad (8)$$

In the foregoing formulas: Y represents a vertical coverage area of a cross section, in a plane where the monitor is located, of a light cone from the virtual image point P, which is used as a virtual light source, to the pupil of the human eye; $Y_{i1}$ represents a vertical distance from an upper boundary of the cross section between the light cone and the monitor to a plane 2, $Y_{i2}$ represents a vertical distance from a lower boundary of the cross section between the light cone and the monitor to a plane 1, wherein the plane 1 passes through the center of the monitor and is perpendicular to the plane of the monitor, and the plane 2 is a plane that passes through the virtual image point P and is parallel to the plane 1; $y_{min}$ represents a minimum coordinate value of a vertical coverage area of the virtual image point P on the monitor; $y_{max}$ represents a maximum coordinate value of the vertical coverage area of the virtual image point P on the monitor; $d_l$ represents a distance between the monitor and the lenslet array; $d_v$ represents a distance between the virtual image and the lenslet array; and E represents the diameter of the pupil.

(d) According to a known start position of each display sub-region in the vertical direction of the monitor, a serial number of a first display sub-region in the vertical coverage area of the virtual image point P on the monitor is determined. Because a corresponding relationship between sub-images and lenslets is known, a serial number of a lenslet covered in the vertical direction can be obtained.

According to the coverage area and Y-coordinate position information of each display sub-region in the monitor, display sub-regions corresponding to the coverage area can be determined. If the coverage area completely overlaps with vertical position coordinates of the display sub-regions, the display sub-regions at the corresponding vertical coordinates in the coverage area can be conveniently determined as the first display sub-regions; if an edge part of the coverage area does not completely correspond to a complete display sub-region, the first display sub-region may be determined by using an approximate processing method, for example, a display sub-region partially covered by the coverage area is determined as the first display sub-region, or only a display sub-region completely covered by the coverage area is the first display sub-region, or a display sub-region whose coordinate overlapping sub-area with the coverage area satisfies a particular ratio is the first display sub-region. The determining manner is very flexible.

(e) Likewise, by using a method similar to (c) and (d), a serial number of a first display sub-region in a horizontal-direction coverage area of the virtual image point P on the monitor is determined, thereby obtaining a serial number of a first lenslet covered in the horizontal direction.

Lenslets corresponding to the determined lenslet serial numbers are the first lenslets whose focal lengths need to be adjusted. In this solution, the method for determining a lenslet that affects image capture in the depth distribution sub-region is simple and easy to implement.

A person skilled in the art should understand that, in any of the foregoing methods in the specific implementation manners of the present application, sequence numbers of the steps do not mean a corresponding execution order. The corresponding execution order of the steps should be determined according to functions and internal logic thereof, and should not be construed as any limitation on implementation processes of the specific implementation manners of the present application.

Figure 6:
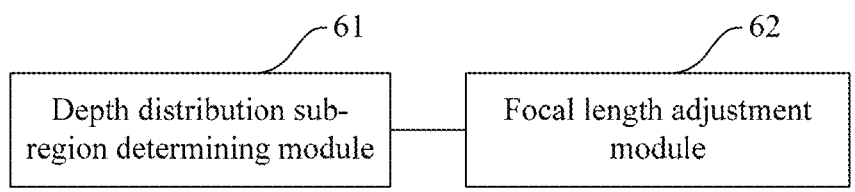
FIG. 6 is a logic block diagram of a light field display control apparatus according to an embodiment of the present application.

FIG. 6 is a logic block diagram of a first light field display control apparatus according to an embodiment of the present application. As shown in FIG. 6, the light field display control apparatus provided in the embodiment of the present application may comprise: a depth distribution sub-region determining module 61 and a focal length adjustment module 62.

The depth distribution sub-region determining module 61 is configured to determine a partial depth distribution sub-region of content according to at least depth distribution information of the content.

The focal length adjustment module 62 is configured to adjust a focal length of a first lenslet according to at least a display DoF range of a light field display device and the depth distribution sub-region, wherein the first lenslet is a lenslet that is in a lenslet array of the light field display device and affects display of a first object, and the first object is a part, which is located in the depth distribution sub-region, of the content.

In the embodiment of the present application, a focal length adjustable feature of a lens is fully utilized; the focal length of the first lenslet may be adjusted according to a current display DoF range of the light field display device and a depth distribution sub-region on which image quality control needs to be performed; a display image distance of the first object in space is changed by adjusting the focal length of the first lenslet, so that an average display image distance of a virtual image which is formed after the first object is displayed by the first lenslet is distributed in the current display DoF range of the light field display device as far as possible, thereby improving display quality of the first object displayed by the first lenslet. This solution can avoid complex computation on source content of a light field, and display quality of a same object can be adjusted by adjusting a focal length of a corresponding lenslet. The solution is simple and easy to control.

The light field display control apparatus may execute the light field display control method in application programs that comprise but not limited to: image presentation, video playback, and the like, to perform image display control. A device manifestation form of the light field display control apparatus is not limited. For example, the light field display control apparatus may be an independent component, and the component is in coordination and communication with a light field display device; or the light field display control apparatus may be integrated in a light field display device as a functional module, and the light field display device may comprise but not limited to: an electronic device having a light field display capability. For example, the light field display device may comprise but not limited to: a near-to-eye light field display device, and the near-to-eye light field display device may comprise but not limited to: a smart helmet, smart glasses, and the like.

Optionally, an average circle of confusion, in a first display plane of the light field display device, of the first object displayed by the first lenslet whose focal length has been adjusted is less than or equal to a permissible circle of confusion, wherein the first display plane is a display plane that is corresponding to a focusing distance for viewing in a depth direction and perpendicular to the depth direction. In this solution, reduction of the average circle of confusion in the first display plane can be used as a convergence condition for focal length adjustment of the first lenslet, thereby improving the efficiency and pertinence of the focal length adjustment of the first lenslet.

Figure 7:
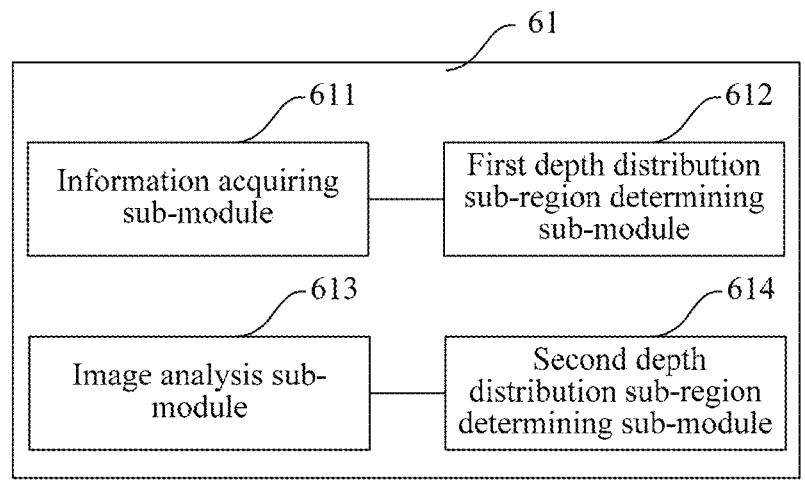
FIG. 7 is a logic block diagram of a depth distribution sub-region determining module according to an embodiment of the present application.

With reference to any technical solution provided by the embodiments of the present application, as shown in FIG. 7, optionally, the depth distribution sub-region determining module 61 comprises: an information acquiring sub-module 611 and a first depth distribution sub-region determining sub-module 612. The information acquiring sub-module 611 is configured to acquire ROI information and the depth distribution information; and the first depth distribution sub-region determining sub-module 612 is configured to determine the depth distribution sub-region according to the ROI information and the depth distribution information. In this solution, the depth distribution information of the content and the interest information are combined to determine a partial depth distribution sub-region of the content as the depth distribution sub-region on which display quality control needs to be performed, so that the determining of the depth distribution sub-region fits an actual requirement of the user more desirably, and a personalized application requirement of the user can be better satisfied.

With reference to any technical solution provided by the embodiments of the present application, optionally, the depth distribution sub-region determining module 61 comprises: an image analysis sub-module 613 and a second depth distribution sub-region determining sub-module 614. The image analysis sub-module 613 is configured to perform image analysis on the content; and the second depth distribution sub-region determining sub-module 614 is configured to determine the depth distribution sub-region according to a result of the image analysis and the depth distribution information. In this solution, the result of the image analysis on the content and the depth distribution information of the content are combined to automatically determine the depth distribution sub-region on which display quality control needs to be performed, so that the determining of the depth distribution sub-region is more intelligent, and the efficiency and universality of determining the depth distribution sub-region are improved.

Figure 8:
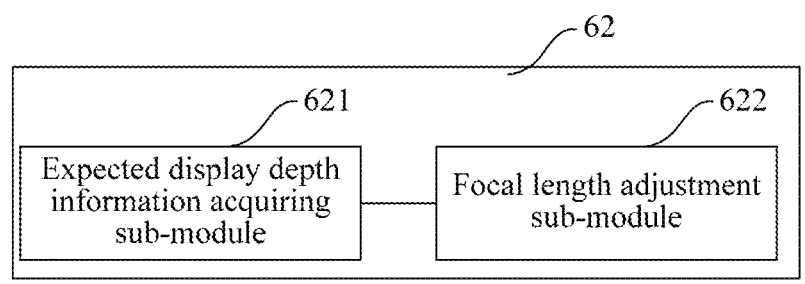
FIG. 8 is a logic block diagram of a focal length adjustment module according to an embodiment of the present application.

With reference to any technical solution provided by the embodiments of the present application, as shown in FIG. 8, optionally, the focal length adjustment module 62 comprises: an expected display depth information acquiring sub-module 621 and a focal length adjustment sub-module 622. The expected display depth information acquiring sub-module 621 is configured to determine expected display depth information of the first object according to at least the display DoF range; and the focal length adjustment sub-module 622 is configured to adjust the focal length of the first lenslet according to at least the expected display depth information. By means of this solution, image distance information of the first object displayed by the first lenslet whose focal length has been adjusted is close to the expected display depth information as much as possible or even matches the expected display depth information, thereby improving display quality of the first object.

Figure 9:
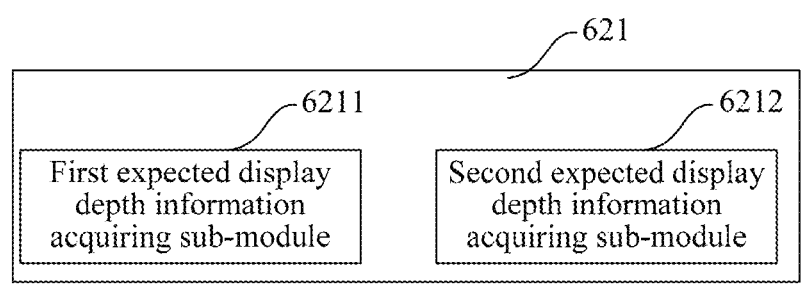
FIG. 9 is a logic block diagram of an expected display depth information acquiring sub-module according to an embodiment of the present application.

Optionally, as shown in FIG. 9, the expected display depth information acquiring sub-module 621 comprises: a first expected display depth information acquiring sub-module 6211. The first expected display depth information acquiring sub-module 6211 is configured to determine any display depth in the display DoF range as the expected display depth information of the first object. Determining the expected display depth information by using this solution is simple, and an implementation manner is flexible.

Optionally, the expected display depth information acquiring sub-module 621 comprises: a second expected display depth information acquiring sub-module 6212. The second expected display depth information acquiring sub-module 6212 is configured to determine a display depth, which is in the display DoF range and close to the depth distribution sub-region, as the expected display depth information of the first object according to a relative distribution of the depth distribution sub-region and the display DoF range in the depth direction. By means of this solution, the expected display depth information is determined and subsequent display control is performed according to the expected display depth information, so that the sense of depth of the user during watching is not reduced while display clearness is improved, thereby improving user experience.

Figure 10:
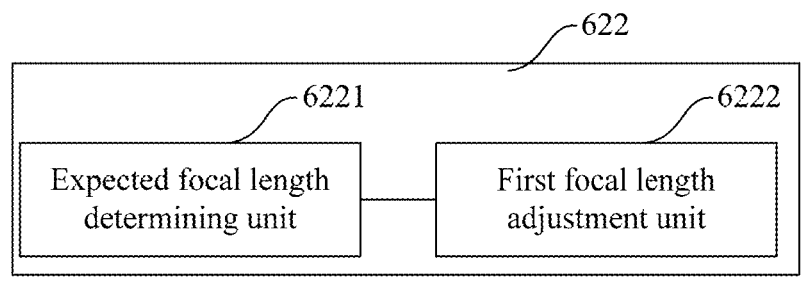
FIG. 10 is a logic block diagram of a focal length adjustment sub-module according to an embodiment of the present application.

Optionally, as shown in FIG. 10, the focal length adjustment sub-module 622 comprises: an expected focal length determining unit 6221 and a first focal length adjustment unit 6222. The expected focal length determining unit 6221 is configured to determine an expected focal length of the first lenslet according to the expected display depth information and a distance between a monitor and the lenslet array in the light field display device; and the first focal length adjustment unit 6222 is configured to adjust the focal length of the first lenslet according to at least the expected focal length. After the expected focal length of the first lenslet is determined, the focal length of the first lenslet is adjusted according to at least the expected focal length, thereby improving the efficiency and pertinence of focal length adjustment of the first lenslet.

Figure 11:
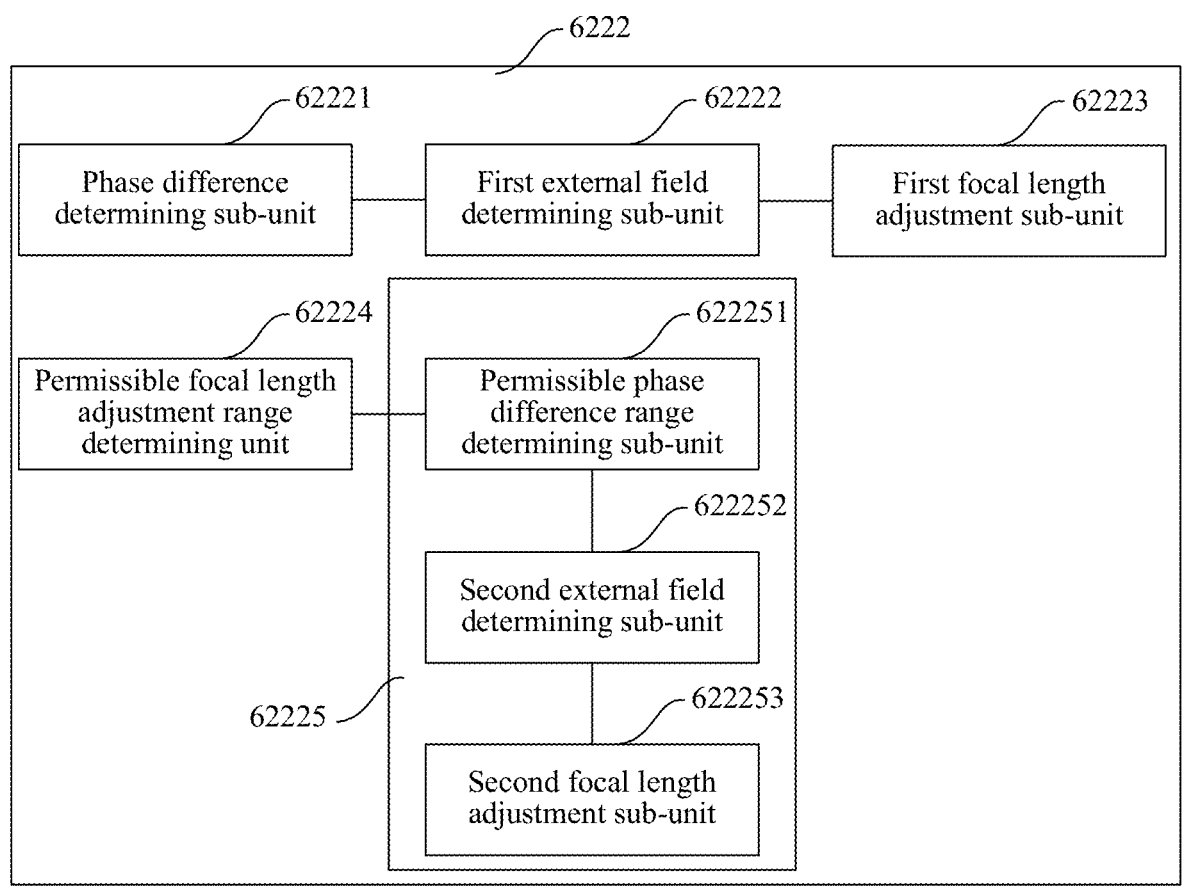
FIG. 11 is a logic block diagram of a first focal length adjustment unit according to an embodiment of the present application.

Further optionally, as shown in FIG. 11, the first focal length adjustment unit 6222 comprises: a phase difference determining sub-unit 62221, a first external field determining sub-unit 62222, and a first focal length adjustment sub-unit 62223. The phase difference determining sub-unit 62221 is configured to determine, according to at least the expected focal length, a phase difference that is formed after incident light passes through different parts of the first lenslet; the first external field determining sub-unit 62222 is configured to determine, according to a mapping relationship between phase differences and external fields, an external field corresponding to the phase difference; and the first focal length adjustment sub-unit 62223 is configured to change, by means of the external field, the phase difference that is formed after the incident light passes through the different parts of the first lenslet, so as to adjust the focal length of the first lenslet. In this solution, it is unnecessary to move or tilt the first lenslet in the light field display device; instead, the material characteristic of the first lenslet is fully utilized to implement focal length adjustment. Therefore, this helps simplify a system mechanical structure, and can meet integration requirements of devices that comprise but not limited to: light, thin, and portable devices; besides, this solution is simple and easy to implement, which improves control efficiency of the focal length adjustment of the first lenslet.

Optionally, the first focal length adjustment unit 6222 comprises: a permissible focal length adjustment range determining unit 62224 and a second focal length adjustment unit 62225. The permissible focal length adjustment range determining unit 62224 is configured to determine a permissible focal length adjustment range of the first lenslet according to at least the expected focal length; and the second focal length adjustment unit 62225 is configured to adjust the focal length of the first lenslet according to at least the permissible focal length adjustment range. In this solution, a permissible phase difference range corresponding to the permissible focal length adjustment range may be determined, and an external field corresponding to any phase difference in the permissible phase difference range may be determined as a control source for focal length adjustment of the first lenslet, thereby implementing required focal length adjustment for the first lenslet and improving the convenience and flexibility of the focal length adjustment control.

Further optionally, the second focal length adjustment unit 62225 may comprise: a permissible phase difference range determining sub-unit 622251, a second external field determining sub-unit 622252, and a second focal length adjustment sub-unit 622253. The permissible phase difference range determining sub-unit 622251 is configured to determine, according to the permissible focal length adjustment range, a permissible phase difference range that is formed after incident light passes through different parts of the first lenslet; the second external field determining sub-unit 622252 is configured to determine, according to a mapping relationship between phase differences and external fields, an external field corresponding to a permissible phase difference in the permissible phase difference range; and the second focal length adjustment sub-unit 622253 is configured to change, by means of the external field, a phase difference that is formed after the incident light passes through the different parts of the first lenslet, so as to adjust the focal length of the first lenslet. A maximum permissible phase difference range can be obtained by using this solution, which helps improve the control efficiency and flexibility of focal length adjustment.

Figure 12:
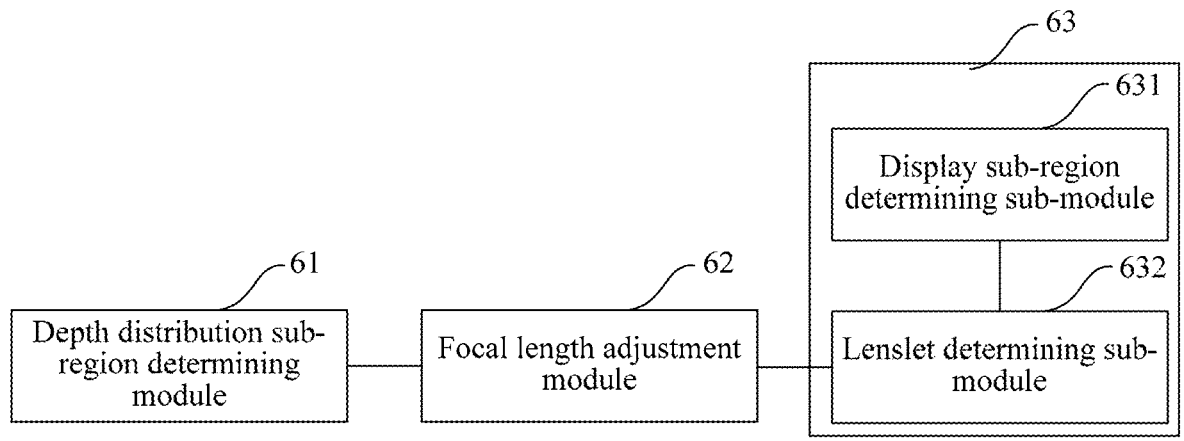
FIG. 12 is a logic block diagram of a light field display control apparatus according to an embodiment of the present application.

Optionally, as shown in FIG. 12, the light field capture control apparatus further comprises: a lenslet determining module 63. The lenslet determining module 63 is configured to determine a lenslet which is in the lenslet array and affects display of the first object as the first lenslet. After the first lenslet to be adjusted is determined, the focal length of the first lenslet may be adjusted to improve display quality of the first object.

Further optionally, the lenslet determining module 63 comprises: a display sub-region determining sub-module 631 and a lens determining sub-module 632. The display sub-region determining sub-module 631 is configured to determine a first display sub-region according to the expected display depth information, the focusing distance for viewing, and a pupil size of a human eye, wherein the first display sub-region is a display sub-region that is in the monitor of the light field display device and affects display of the first object; and the lens determining sub-module 632 is configured to determine, according to a mapping relationship between display sub-regions in the monitor and lenslets in the lenslet array, a lenslet which is in the lenslet array and corresponding to the first display sub-region as the first lenslet. This solution for determining the first lenslet is simple and easy to implement.

Figure 13:
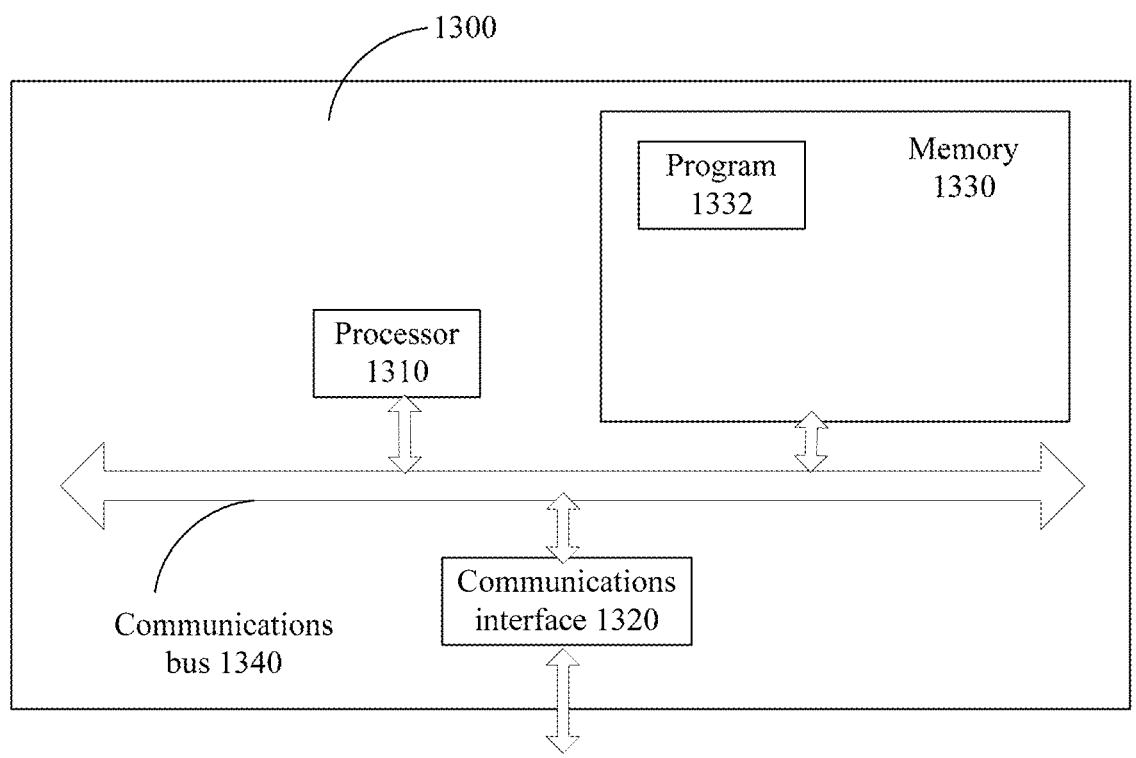
FIG. 13 is a logic block diagram of a light field display control apparatus according to an embodiment of the present application.

FIG. 13 is a structural block diagram of a fourth light field display control apparatus according to an embodiment of the present application. The specific embodiment of the present application does not limit a specific implementation manner of the light field display control apparatus 1300. As shown in FIG. 13, the light field display control apparatus 1300 may comprise:

a processor 1310, a communications interface 1320, a memory 1330, and a communications bus 1340.

The processor 1310, the communications interface 1320 and the memory 1330 communicate with each other by using the communications bus 1340.

The communications interface 1320 is configured to communicate with a device having a communications function, an external light source, and the like.

The processor 1310 is configured to execute a program 1332, and specifically may execute related steps in any one of the foregoing embodiments of the light field display control method.

For example, the program 1332 may comprise program code, and the program code comprises a computer operation instruction.

The processor 1310 may be a central processing unit (CPU), or an application specific integrated circuit (ASIC), or is configured to be one or more integrated circuits for implementing the present application.

The memory 1330 is configured to store the program 1332. The memory 1330 may comprise a random access memory (RAM), or may further comprise a non-volatile memory, for example, at least one magnetic disk memory.

For example, in an optional implementation manner, the processor 1310 may execute the following steps by executing the program 1332: determining a partial depth distribution sub-region of content according to at least depth distribution information of the content; and adjusting a focal length of a first lenslet according to at least a display DoF range of a light field display device and the depth distribution sub-region, wherein the first lenslet is a lenslet that is in a lenslet array of the light field display device and affects display of a first object, and the first object is a part, which is located in the depth distribution sub-region, of the content.

In another optional implementation manner, the processor 1310 may further execute steps mentioned in any other embodiment above by executing the program 1332, and details are not described herein again.

For specific implementation of the steps in the program 1332, refer to corresponding descriptions in the corresponding steps, modules, sub-modules, and units in the foregoing embodiments, and details are not described herein again. It may be clearly understood by a person skilled in the art that, for the purpose of convenient and brief description, for a specific working process of the foregoing system, apparatus, and unit, reference may be made to a corresponding process in the foregoing method embodiments, and details are not described herein again.

Figure 14:
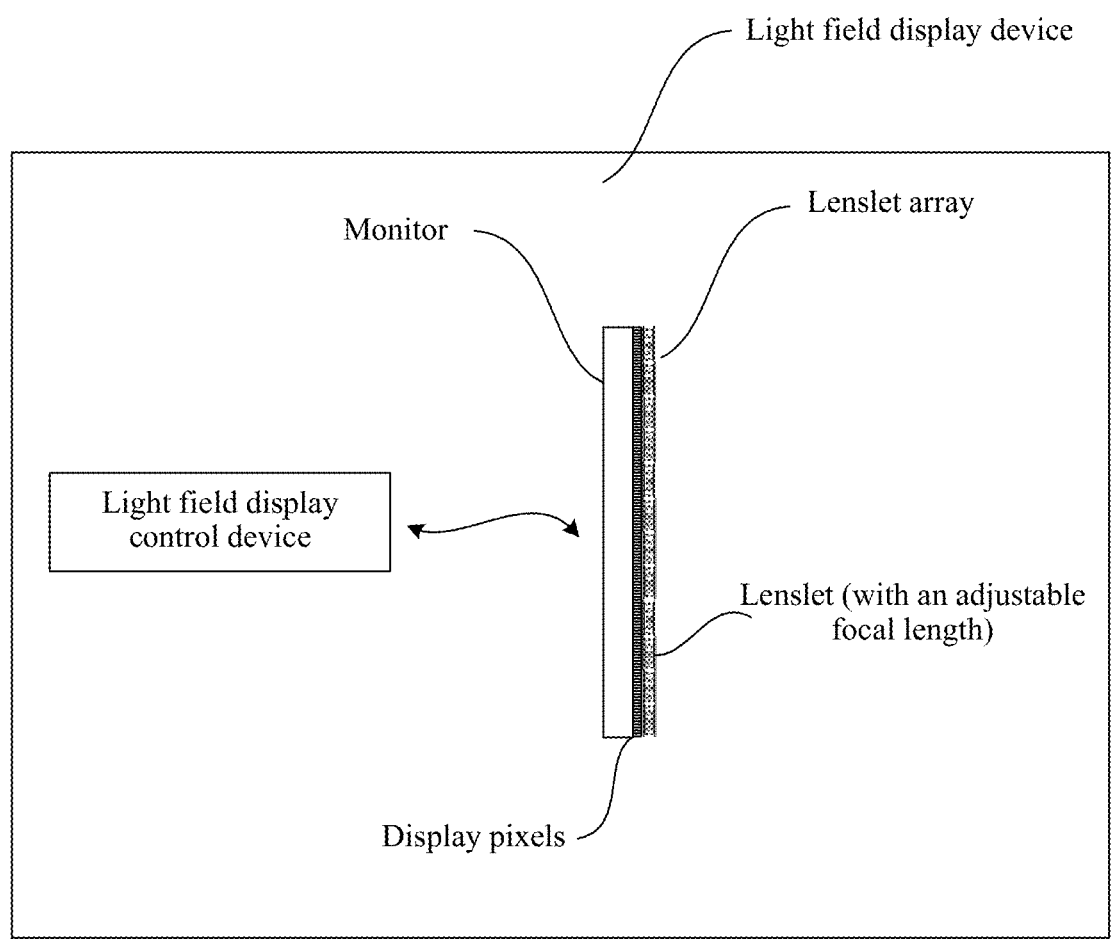
FIG. 14 is a schematic structural diagram of a light field display device according to an embodiment of the present application.

An embodiment of the present application further provides a light field display device. As shown in FIG. 14, the light field display device comprises: a monitor, a lenslet array, and a light field display control apparatus; the monitor and the lenslet array are arranged close to each other (that is, a distance between the monitor and the lenslet array is very small, and is usually less than a maximum focal length of the lenslets in the lenslet array); the lenslet array comprises multiple lenslets with adjustable focal lengths distributed in the array, and the light field display control apparatus is connected to the monitor and the lenslet array, and controls focal length adjustment of one or more lenslets to improve partial display clearness. The control manner comprises but not limited to: controlling, by the optical display control apparatus, an external field acting on a corresponding lenslet to adjust the focal length of the corresponding lenslet, and the like. The light field display control apparatus may be any light field display control apparatus provided in the embodiments of the present application, and can execute, in application processes that comprise but not limited to: image presentation, video playback, and the like, any light field display control method provided in the embodiments of the present application, to perform image display control. For a principle and an apparatus structure for the light field display control performed by the light field display device, refer to the description in other embodiments of the present application, and details are not described herein again.

In the embodiments of the present application, the serial numbers and/or corresponding order of the embodiments is merely used for description, and is not intended to represent merits of the embodiments. The descriptions on the embodiments have their respective emphasis, and for a part that is not described in detail in a certain embodiment, reference may be made to related description in another embodiment. For related descriptions of implementation principles or processes related to the apparatus, device or system embodiments, reference may be made to the records of the corresponding method embodiments, which are not repeated herein.

A person of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. A person skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and comprises several instructions for instructing a computer device (which may be a personal computer, a server, a network device, or the like) to execute all or part of the steps of the method described in each of the embodiments of the present application. The aforementioned storage medium comprises: any medium that can store program codes, such as a USB disk, a removable hard disk, a read-only memory (ROM), a random access memory (RAM), a magnetic disk, or an optical disc.

In the embodiments of the apparatus, method and system of the present application, apparently, each component (such as the system, sub-system, module, sub-module, unit, and sub-unit) or each step may be decomposed, combined and/or combined after being decomposed. The decomposition and/or re-combination should be considered as an equivalent solution of the present application. Meanwhile, in the description of the specific embodiments of the present application, a feature described and/or shown for one implementation manner may be used in one or more other implementation manners in an identical or similar way, may be combined with a feature in another implementation manner, or may replace a feature in another implementation manner.

It should be emphasized that the term "comprise/contain" used in this text to indicate existence of a feature, element, step or component, and does not exclude existence or addition of one or more other features, elements, steps or components.

Finally, it should be noted that: the aforementioned description of the implementation manners are merely provided for describing the present application, but not intended to limit the present application. A person of ordinary skill in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A light field display control method, comprising:
determining a depth distribution sub-region of content according to at least depth distribution information of the content, wherein a display quality control is performed on the depth distribution sub-region of content; and
adjusting a focal length of a first lenslet according to at least a display depth of field (DoF) range of a light field display device and the depth distribution sub-region, wherein the first lenslet is a lenslet that is in a lenslet array of the light field display device and affects display of a first object, and the first object is a part, which is located in the depth distribution sub-region, of the content,
wherein adjusting the focal length of the first lenslet comprises:
determining expected display depth information of the first object according to at least the display DoF range;
determining an expected focal length of the first lenslet according to the expected display depth information and a distance between a monitor and the lenslet array in the light field display device; and
adjusting the focal length of the first lenslet according to at least the expected focal length by:
determining, according to the expected focal length of the first lenslet, a phase difference that is formed after incident light passes through different parts of the first lenslet;
determining, according to a mapping relationship between phase differences and external fields, an external field corresponding to the phase difference; and changing, by means of the external field, the phase difference that is formed after the incident light passes through the different parts of the first lenslet to adjust the focal length of the first lenslet.

2. The method of claim 1, wherein an average circle of confusion, in a first display plane of the light field display device, of the first object displayed by the first lenslet whose focal length has been adjusted is less than or equal to a permissible circle of confusion, and the first display plane is a display plane that is corresponding to a focusing distance for viewing in a depth direction and perpendicular to the depth direction.

3. The method of claim 1, wherein determining a depth distribution sub-region of content according to at least depth distribution information of the content comprises:
  acquiring region of interest (ROI) information and the depth distribution information; and
  determining the depth distribution sub-region according to the ROI information and the depth distribution information.

4. The method of claim 1, wherein determining a depth distribution sub-region of content according to at least depth distribution information of the content comprises:
  performing image analysis on the content; and
  determining the depth distribution sub-region according to a result of the image analysis and the depth distribution information.

5. The method of claim 1, wherein the determining expected display depth information of the first object according to at least the display DoF range comprises:
  determining any display depth in the display DoF range as the expected display depth information of the first object.

6. The method of claim 1, wherein the determining expected display depth information of the first object according to at least the display DoF range comprises:
  determining a display depth, which is in the display DoF range and close to the depth distribution sub-region, as the expected display depth information of the first object according to a relative distribution of the depth distribution sub-region and the display DoF range in the depth direction.

7. The method of claim 1, wherein
  the first lenslet is a first liquid crystal lenslet; and
  the determining, according to the expected focal length, a phase difference that is formed after incident light passes through different parts of the first lenslet comprises: determining, according to the expected focal length, a radius of the first liquid crystal lenslet, and a wavelength of the incident light, the phase difference that is formed after the incident light passes through different parts of the first liquid crystal lenslet.

8. The method of claim 1, wherein the adjusting the focal length of the first lenslet according to at least the expected focal length comprises:
  determining a permissible focal length adjustment range of the first lenslet according to at least the expected focal length; and
  adjusting the focal length of the first lenslet according to at least the permissible focal length adjustment range.

9. The method of claim 8, wherein the adjusting the focal length of the first lenslet according to at least the permissible focal length adjustment range comprises:
  determining, according to the permissible focal length adjustment range, a permissible phase difference range that is formed after incident light passes through different parts of the first lenslet;
  determining, according to the mapping relationship between the phase differences and the external fields, the external field corresponding to a permissible phase difference in the permissible phase difference range; and
  changing, by means of the external field, the phase difference that is formed after the incident light passes through the different parts of the first lenslet to adjust the focal length of the first lenslet.

10. The method of claim 9, wherein
  the first lenslet is a first liquid crystal lenslet; and
  the determining, according to the permissible focal length adjustment range, a permissible phase difference range that is formed after incident light passes through different parts of the first lenslet comprises:
    determining, according to a maximum permissible focal length in the permissible focal length adjustment range, a radius of the first liquid crystal lenslet, and a wavelength of the incident light, a first phase difference that is formed after the incident light passes through different parts of the first liquid crystal lenslet;
    determining, according to a minimum permissible focal length in the permissible focal length adjustment range, the radius of the first liquid crystal lenslet, and the wavelength of the incident light, a second phase difference that is formed after the incident light passes through different parts of the first liquid crystal lenslet; and
    determining the permissible phase difference range according to the first phase difference and the second phase difference.

11. The method of claim 1, wherein before the first lenslet is adjusted, the method further comprises:
  determining a lenslet which is in the lenslet array and affects display of the first object as the first lenslet.

12. The method of claim 11, wherein the determining a lenslet which is in the lenslet array and affects display of the first object as the first lenslet comprises:
  determining a first display sub-region according to expected display depth information, a focusing distance for viewing, and a pupil size of a human eye, wherein the first display sub-region is a display sub-region that is in the monitor of the light field display device and affects display of the first object; and
  determining, according to a mapping relationship between display sub-regions in the monitor and lenslets in the lenslet array, a lenslet which is in the lenslet array and corresponding to the first display sub-region as the first lenslet.

13. A light field display control apparatus, comprising: a processor, a communications interface, a memory, and a communications bus, wherein the processor, the communications interface, and the memory communicate with each other by means of the communications bus;
  the memory is configured to store at least one instruction, and the instruction causes the processor to perform the following operations:
    determining a depth distribution sub-region of content according to at least depth distribution information of the content, wherein a display quality control is performed on the depth distribution sub-region of content; and
    adjusting a focal length of a first lenslet according to at least a display depth of field (DoF) range of a light field display device and the depth distribution sub-region, wherein the first lenslet is a lenslet that is in a lenslet array of the light field display device and affects display of a first object, and the first object is a part, which is located in the depth distribution sub-region, of the content, wherein, adjusting the focal length of the first lenslet comprises:

determining expected display depth information of the first object according to at least the display DoF range;

determining an expected focal length of the first lenslet according to the expected display depth information and a distance between a monitor and the lenslet array in the light field display device; and adjusting the focal length of the first lenslet according to at least the expected focal length by:

determining, according to the expected focal length of the first lenslet, a phase difference that is formed after incident light passes through different parts of the first lenslet;

determining, according to a mapping relationship between phase differences and external fields, an external field corresponding to the phase difference; and changing, by means of the external field, the phase difference that is formed after the incident light passes through the different parts of the first lenslet to adjust the focal length of the first lenslet.

14. A light field display device, comprising:

a monitor;

a lenslet array, wherein the lenslet array comprises multiple lenslets with adjustable focal lengths distributed in the array; and a light field display control apparatus of claim 13, wherein the light field display control apparatus is connected to the monitor and the lenslet array.

15. The apparatus of claim 13, wherein an average circle of confusion, in a first display plane of the light field display device, of the first object displayed by the first lenslet whose focal length has been adjusted is less than or equal to a permissible circle of confusion, and the first display plane is a display plane that is corresponding to a focusing distance for viewing in a depth direction and perpendicular to the depth direction.

16. The apparatus of claim 13, wherein determining a depth distribution sub-region of content according to at least depth distribution information of the content comprises:

acquiring region of interest (ROI) information and the depth distribution information; and determining the depth distribution sub-region according to the ROI information and the depth distribution information.

17. The apparatus of claim 13, wherein determining a depth distribution sub-region of content according to at least depth distribution information of the content comprises:

performing image analysis on the content; and determining the depth distribution sub-region according to a result of the image analysis and the depth distribution information.

18. The apparatus of claim 13, wherein the determining expected display depth information of the first object according to at least the display DoF range comprises:

determining any display depth in the display DoF range as the expected display depth information of the first object.

19. The apparatus of claim 13, wherein the determining expected display depth information of the first object according to at least the display DoF range comprises:

determining a display depth, which is in the display DoF range and close to the depth distribution sub-region, as the expected display depth information of the first object according to a relative distribution of the depth distribution sub-region and the display DoF range in the depth direction.

20. The apparatus of claim 13, wherein the first lenslet is a first liquid crystal lenslet; and the determining, according an expected focal length, a phase difference that is formed after incident light passes through different parts of the first lenslet comprises:

determining, according to the expected focal length, a radius of the first liquid crystal lenslet, and a wavelength of the incident light, the phase difference that is formed after the incident light passes through different parts of the first liquid crystal lenslet.

21. The apparatus of claim 13, wherein the adjusting the focal length of the first lenslet according to at least the expected focal length comprises:

determining a permissible focal length adjustment range of the first lenslet according to at least the expected focal length; and adjusting the focal length of the first lenslet according to at least the permissible focal length adjustment range.

22. The apparatus of claim 21, wherein the adjusting the focal length of the first lenslet according to at least the permissible focal length adjustment range comprises:

determining, according to the permissible focal length adjustment range, a permissible phase difference range that is formed after incident light passes through different parts of the first lenslet;

determining, according to the mapping relationship between the phase differences and the external fields, the external field corresponding to a permissible phase difference in the permissible phase difference range; and changing, by means of the external field, the phase difference that is formed after the incident light passes through the different parts of the first lenslet to adjust the focal length of the first lenslet.

23. The apparatus of claim 22, wherein the first lenslet is a first liquid crystal lenslet; and the determining, according to the permissible focal length adjustment range, a permissible phase difference range that is formed after incident light passes through different parts of the first lenslet comprises:

determining, according to a maximum permissible focal length in the permissible focal length adjustment range, a radius of the first liquid crystal lenslet, and a wavelength of the incident light, a first phase difference that is formed after the incident light passes through different parts of the first liquid crystal lenslet;

determining, according to a minimum permissible focal length in the permissible focal length adjustment range, the radius of the first liquid crystal lenslet, and the wavelength of the incident light, a second phase difference that is formed after the incident light passes through different parts of the first liquid crystal lenslet; and determining the permissible phase difference range according to the first phase difference and the second phase difference.

24. The apparatus of claim 13, wherein before the first lenslet is adjusted, the operations further comprise:

determining a lenslet which is in the lenslet array and affects display of the first object as the first lenslet.

25. The apparatus of claim 24, wherein the determining a lenslet which is in the lenslet array and affects display of the first object as the first lenslet comprises:

determining a first display sub-region according to the expected display depth information, the focusing distance for viewing, and a pupil size of a human eye, wherein the first display sub-region is a display sub-region that is in the monitor of the light field display device and affects display of the first object; and determining, according to a mapping relationship between display sub-regions in the monitor and lenslets in the lenslet array, a lenslet which is in the lenslet array and corresponding to the first display sub-region as the first lenslet.

* * * * *

UNITED STATES PATENT AND TRADEMARK OFFICE
CERTIFICATE OF CORRECTION

PATENT NO. : 10,708,576 B2
APPLICATION NO. : 15/382621
DATED : July 7, 2020
INVENTOR(S) : Lin Du and Liang Zhou Page 1 of 1

It is certified that error appears in the above-identified patent and that said Letters Patent is hereby corrected as shown below:

On the Title Page

Assignee, Item (73):
"BEIJING ZHIGU RIU TECH CO., LTD." should read -- BEIJING ZHIGU RUI TUO TECH CO., LTD. --.

Signed and Sealed this
Eighth Day of September, 2020

Andrei Iancu
*Director of the United States Patent and Trademark Office*